United States Patent [19]

Mano

[11] Patent Number: 5,995,983
[45] Date of Patent: *Nov. 30, 1999

[54] INFORMATION PROCESSING APPARATUS AND DATA PROCESSING METHOD FOR INFORMATION PROCESSING APPARATUS

[75] Inventor: Kosei Mano, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/698,960

[22] Filed: Aug. 16, 1996

[30] Foreign Application Priority Data

Aug. 25, 1995 [JP] Japan .................................. 7-217942

[51] Int. Cl.⁶ .................................................. G06F 17/30
[52] U.S. Cl. .............................. 707/204; 707/8; 709/105
[58] Field of Search .................................... 707/200, 202, 707/204, 203, 8; 709/105

[56] References Cited

U.S. PATENT DOCUMENTS

| 5,222,217 | 6/1993 | Blount et al. ............................ 707/204 |
| 5,317,728 | 5/1994 | Tevis et al. ............................. 707/204 |
| 5,423,037 | 6/1995 | Hvasshovd .............................. 707/202 |
| 5,506,987 | 4/1996 | Abramson et al. ..................... 395/673 |
| 5,546,534 | 8/1996 | Malcolm .............................. 395/182.04 |
| 5,642,505 | 6/1997 | Fushimi .................................. 707/204 |
| 5,649,184 | 7/1997 | Hayashi et al. ............................. 707/8 |
| 5,664,186 | 9/1997 | Bennett et al. ......................... 707/204 |
| 5,699,504 | 12/1997 | Mano ................................. 395/182.11 |
| 5,757,385 | 5/1998 | Narayanaswami et al. ............ 345/505 |
| 5,867,705 | 2/1999 | Mano ..................................... 395/732 |

*Primary Examiner*—Thomas G. Black
*Assistant Examiner*—Charles L. Rones
*Attorney, Agent, or Firm*—Helfgott & Karas, P C.

[57] ABSTRACT

The invention provides an information processing apparatus and a data processing method for the information processing apparatus wherein software processing is performed using a program and/or data and which are improved in that the reliability of data can be raised flexibly in accordance with a degree of reliability required for the data even after operation of a system is started without using a specific backup hardware construction. The information processing apparatus is of the type wherein software processing is performed using data stored in a storage apparatus and includes a first storage apparatus for storing original data, a second storage apparatus for storing preliminary data which can back up the original data and can be used similarly to the original data in the software processing, and a data duplicating registration section for storing a relation between the original data and the preliminary data into a storage table.

21 Claims, 17 Drawing Sheets

FIG.5

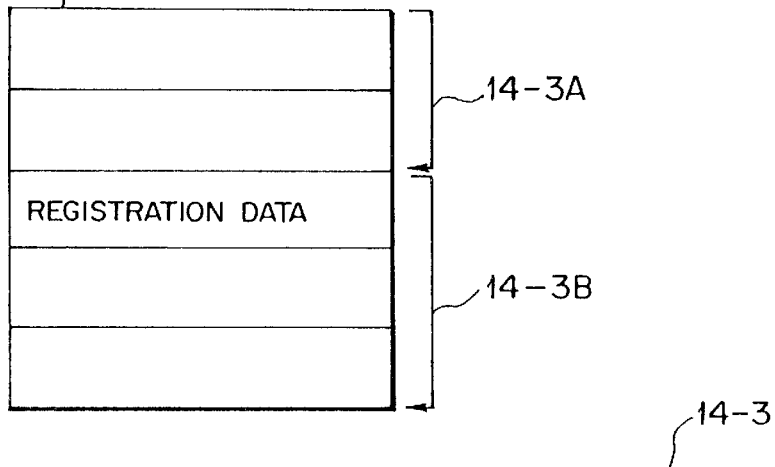

14-3: DATA DUPLICATING REGISTRATION TABLE 14-3A
REGISTRATION DATA
14-3B

REGISTRATION DATA CONSTRUCTION

| | PRELIMINARY DATA STATE | ORIGINAL DATA STATE | 0 |
|---|---|---|---|
| ORIGINAL DATA REGISTRATION APPARATUS NUMBER | | | 1 |
| ORIGINAL DATA REGISTRATION APPARATUS INTERNAL ADDRESS | | | 2 |
| ORIGINAL DATA SIZE | | | 3 |
| POINTER (OR NUMBER) TO ORIGINAL DATA READING IN ROUTINE | | | 4 |
| POINTER (OR NUMBER) TO ORIGINAL DATA WRITING IN ROUTINE | | | 5 |
| POINTER (OR NUMBER) TO ORIGINAL DATA CONVERSION ROUTINE | | | 6 |
| PRELIMINARY DATA REGISTRATION APPARATUS NUMBER | | | 7 |
| PRELIMINARY DATA REGISTRATION APPARATUS INTERNAL ADDRESS | | | 8 |
| PRELIMINARY DATA SIZE | | | 9 |
| POINTER (OR NUMBER) TO PRELIMINARY DATA READING IN ROUTINE | | | 10 |
| POINTER (OR NUMBER) TO PRELIMINARY DATA WRITING IN ROUTINE | | | 11 |
| POINTER (OR NUMBER) TO PRELIMINARY DATA CONVERSION ROUTINE | | | 12 |
| FREE | | | 13 |
| FREE | | | 14 |
| FREE | | | 15 |

FIG. 6

| APPARATUS NAME | APPARATUS IDENTIFICATION NUMBER |
|---|---|
| MAIN MEMORY APPARATUS | 0 |
| FILE MEMORY APPARATUS | 1 |

FIG. 7

| STATE | STATE NUMBER |
|---|---|
| NON-REGISTERED | 0 |
| DISCONNECTED | 1 |
| IN-SERVICE OPERATION PROCEEDING | 2 |
| STAND-BY | 3 |
| CURRENTLY USED | 4 |

FIG. 8

| DATA STATE CONTROL TYPE \ DATA STATE | 0 NON-REGISTERED | 1 DISCONNECTED | 2 IN-SERVICE OPERATION PROCEEDING | 3 STAND-BY | 4 CURRENTLY USED |
|---|---|---|---|---|---|
| DATA REGISTRATION | 1 | — | — | — | — |
| CANCELLATION OF DATA REGISTRATION | — | 0 | — | — | — |
| START OF DATA IN-SERVICE OPERATION | — | 2 | — | — | — |
| COMPLETION OF DATA IN-SERVICE OPERATION | — | — | 3/4 | — | — |
| CHANGE-OVER BETWEEN CURRENTLY USED/STAND-BY | — | — | — | 4 | 3 |
| DATA DISCONNECTION | — | — | 1 | 1 | 1 |

INFORMATION PROCESSING APPARATUS AND DATA PROCESSING METHOD FOR INFORMATION PROCESSING APPARATUS

BACKGROUND OF THE INVENTION

1. Field of the Invention

This invention relates to an information processing apparatus and a data processing method for the information processing apparatus wherein software processing is performed using a program and/or data.

2. Description of the Related Art

Usually, an information processing apparatus performs software processing using required data (including a program for operating the apparatus) stored in a storage apparatus.

In an information processing apparatus of the type mentioned, the data stored in the storage apparatus cannot sometimes be used in software processing when a program suffers from a bug or by some other cause.

For example, in a multi-processor system, it is often the practice that a plurality of processors are integrated so that hardware and software resources are shared by them under an integrated operating system, and the storage apparatus for storing data is used such that data of programs and so forth to be used by the individual processors are allocated in the same space. Consequently, if a program to be used by a certain processor suffers from a bug, then data being used by another processor are sometimes damaged.

In this connection, it has been proposed, for example, to provide an information processing apparatus with a duplex hardware construction or to provide, in addition to a main storage apparatus, an auxiliary storage apparatus for backing up the main storage apparatus in order to enhance the reliability of data.

However, the information processing apparatus described above has a subject to be solved in that, in order to enhance the reliability of data, it is required to expand the hardware and this requires a high hardware cost.

Also it is a possible countermeasure to provide an accommodating apparatus which backs up and accommodates all data and/or programs. This accommodating apparatus, however, requires re-production of or amendment to system software when it becomes necessary to raise the reliability of data after operation of the system is started since the system is fixed.

SUMMARY OF THE INVENTION

It is an objective of the present invention to provide an information processing apparatus and a data processing method for the information processing apparatus wherein the reliability of data can be raised flexibly in accordance with a degree of reliability required for the data even after operation of a system is started without using a specific backup hardware construction.

In order to attain the objective described above, according to an aspect of the present invention, there is provided an information processing apparatus wherein software processing is performed using data, comprising a first storage apparatus for storing original data, a second storage apparatus for storing preliminary data which can back up the original data and can be used similarly to the original data in the software processing, and data duplicating registration means for storing a relation between the original data and the preliminary data into a storage table.

With the information processing apparatus, since original data and preliminary data as well as a relation between them are stored in the storage table, the data stored in the storage apparatus can be duplicated in software to enhance the reliability of data remarkably without using specific backing up hardware. Further, since the state of the data can be controlled, the information processing apparatus is advantageous also in that the reliability of data can be enhanced flexibly in response to a degree of reliability required for the data even after operation of the system is started.

According to another aspect of the present invention, there is provided a data processing method for an information processing apparatus wherein software processing is performed using data, comprising the steps of storing, into a storage apparatus, original data which can be used in the software processing and preliminary data which can back up the original data and can be used similarly in the software processing, and storing a relation between the original data and the preliminary data into said storage table.

With the data processing method for an information processing apparatus, since original data and preliminary data as well as a relation between them are stored in the storage table, the data stored in the storage apparatus can be duplicated in software to enhance the reliability of data remarkably without using specific backing up hardware. Further, since the state of the data can be controlled, the information processing apparatus is advantageous also in that the reliability of data can be enhanced flexibly in response to a degree of reliability required for the data even after operation of the system is started.

According to a further aspect of the present invention, there is provided a data processing method for an information processing apparatus wherein software processing is performed using data, comprising the steps of storing, into a storage apparatus, original data which can be used in the software processing and preliminary data which can back up the original data and can be used similarly in the software processing and storing a relation between the original data and the preliminary data into said storage table, and using one of the original data and the preliminary data as currently used data which are being currently used in the software processing and using the other of the original data and the preliminary data as stand-by state data which can always back up the currently used data with same data contents as those of the currently used data.

With the data processing method for an information processing apparatus, data variation processing is performed for currently used data, and is simultaneously, the same data variation processing (or substantially same data variation processing although the format is different) is performed for stand-by state data. Consequently, an operator of the information processing apparatus need not get aware of the circumstances in the apparatus and can perform an operation readily.

Further objectives, features and advantages of the present invention will become apparent from the following detailed description when read in conjunction with the accompanying drawings in which like parts or elements are denoted by like reference characters.

BRIEF DESCRIPTION OF THE DRAWINGS

FIG. 5 is a diagrammatic view showing a format of a data duplicating registration table of the information processing apparatus of FIG. 3;

FIG. 6 is a diagrammatic view illustrating a preliminary data registration apparatus number stored in the data duplicating registration table of FIG. 5;

FIG. 7 is a diagrammatic view showing state numbers of original data and preliminary data stored in the data duplicating registration table of FIG. 5;

FIG. 8 is a diagrammatic view illustrating transition of a data state by control of a data state control section of the information processing apparatus of FIG. 3;

DESCRIPTION OF THE PREFERRED EMBODIMENT a. Aspect of the Invention

Figure 1:
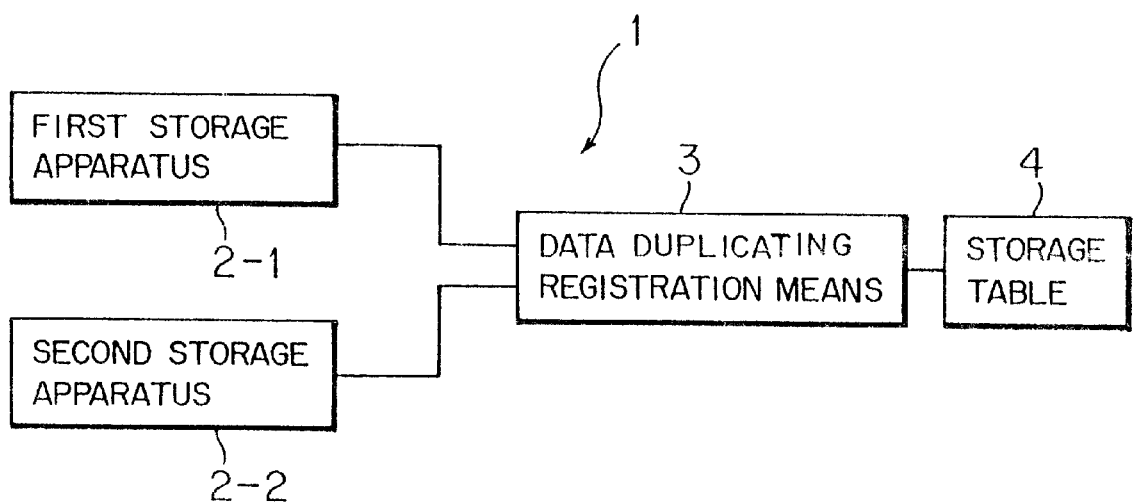
FIG. 1 is a block diagram illustrating an aspect of the present invention.

FIG. 1 shows in block diagram an information processing apparatus according to an aspect of the present invention. Referring to FIG. 1, the information processing apparatus is generally denoted at 1 and performs software processing using required data. The information storage apparatus 1 includes a first storage apparatus 2-1, a second storage apparatus 2-2, data duplicating registration means 3 and a storage table 4.

The first storage apparatus 2-1 stores original data while second storage apparatus 2-2 stores preliminary data which can back up the original data and can be used similarly to the original data in the software processing. The data duplicating registration means 3 stores a relation between the original data and the preliminary data into the storage table 4.

Thus, in the information processing apparatus 1 wherein software processing is performed using data stored in the storage apparatus, in addition to original data which can be used in the software processing, preliminary data which can back up the original data and can be used similarly in the software processing are stored into the storage apparatus, and a relation between the original data and the preliminary data can be stored into the storage table 4.

The information processing apparatus 1 may further include data duplicating cancellation means for deleting from the storage table 4 the information of the relation between the original data and the preliminary data.

Or the information processing apparatus 1 may further comprise data change-over means for changing over the original data and the preliminary data under a given condition in order to use one of the original data and the preliminary data as currently used data which are being currently used in the software processing and use the other of the original data and the preliminary data as stand-by state data which can always back up the currently used data with same data contents as those of the currently used data.

In this instance, the information processing apparatus 1 may further include data disconnection means for cancelling the relation of the currently used data and the stand-by state data, and data restoration means for restoring, after the currently used data and the stand-by state data are disconnected from each other by the data disconnection means, the relation of the currently used data and the stand-by state data between the original data and the preliminary data.

Otherwise, the information processing apparatus 1 may be constructed such that it further includes check information setting means for setting check information for the currently used data and the stand-by state data, and verification means for verifying, when the software processing is to be executed using the currently used data, the normality of the currently used data using the check information, and that the software processing is executed, when no abnormality is detected from the currently used data by the verification means, using the currently used data, but when some abnormality is detected from the currently used data by the verification means, the software processing is executed using the stand-by state data.

Or, the information processing apparatus may further include data variation processing means for performing data variation processing for the currently used data and simultaneously performing the same data variation processing for the stand-by state data. In this instance, the data variation processing means may include data format variation means for simultaneously performing, when data variation processing is performed for the currently used data by the data variation processing means, substantially same data variation processing for the stand-by state data although the format is different.

In the information processing apparatus 1 described above, from the storage table 4 in which the relation between the original data and the preliminary data is stored, the information of the relation between the original data and the preliminary data can be deleted.

Further, in the information processing apparatus 1 described above, original data which can be used in the software processing and preliminary data which can back up the original data and can be used similarly in the software processing can be stored into a storage apparatus whereas a relation between the original data and the preliminary data into the storage table 4, and one of the original data and the preliminary data can be used as currently used data which are being currently used in the software processing whereas the other of the original data and the preliminary data can be used as stand-by state data which can always back up the currently used data with same data contents as those of the currently used data.

In this instance, the currently used data and the stand-by state data may be changed over under a given condition, and the software processing may be executed using the data after the changing over. Or, the currently used data and the stand-by state data may be disconnected from each other. In this instance, the original data and the preliminary data are disconnected, the relation of the currently used data and the stand-by state data between the original data and the preliminary data may be restored.

Further, the data processing method may be constructed such that check information for the currently used data and the stand-by state data is prepared, and the normality of the currently used data is verified, when the software processing is to be executed using the currently used data, using the check information, and then if no abnormality is detected from the currently used data, then the software processing is executed using the currently used data, but if some abnormality is detected from the currently used data, the software processing is executed using the stand-by state data.

Or, the data processing method may be constructed such that, when data variation processing is performed for the currently used data, then the same data variation processing is performed simultaneously for the stand-by state data, or such that, when data variation processing is performed for the currently used data, then substantially same data variation processing is performed for the stand-by state data although the format is different.

With the information processing apparatus and the data processing method for an information processing apparatus according to the present invention, since a relation between original data and preliminary data is stored in the storage table 4, there is an advantage in that the data stored in the storage apparatus can be duplicated in software to enhance the reliability of data remarkably without using specific backing up hardware. Further, since the data state can be controlled by the data duplicating registration means 3, the data duplicating cancellation means, the data change-over means, the data disconnection means and the data restoration means, there is another advantage in that, even if operation of the system is started, the reliability of data can be enhanced flexibly in response to a degree of reliability required for the data.

Further, with the information processing apparatus and the data processing method for an information processing apparatus, abnormality of currently used data can be detected. Consequently, when abnormality is detected, stand-by state data can be changed over to currently used data. As a result, the system is prevented from malfunction, and the reliability of data is enhanced remarkably.

Furthermore, with the information processing apparatus and the data processing method for an information processing apparatus, if data variation processing is performed for currently used data by the data variation processing means or the data format variation means, then the same data variation processing (or substantially same data processing although the format is different) is performed for stand-by state data simultaneously. Consequently, an operator of the information processing apparatus need not get aware of the circumstances in the apparatus and can perform an operation readily.

b. Embodiment of the Invention

Figure 2:
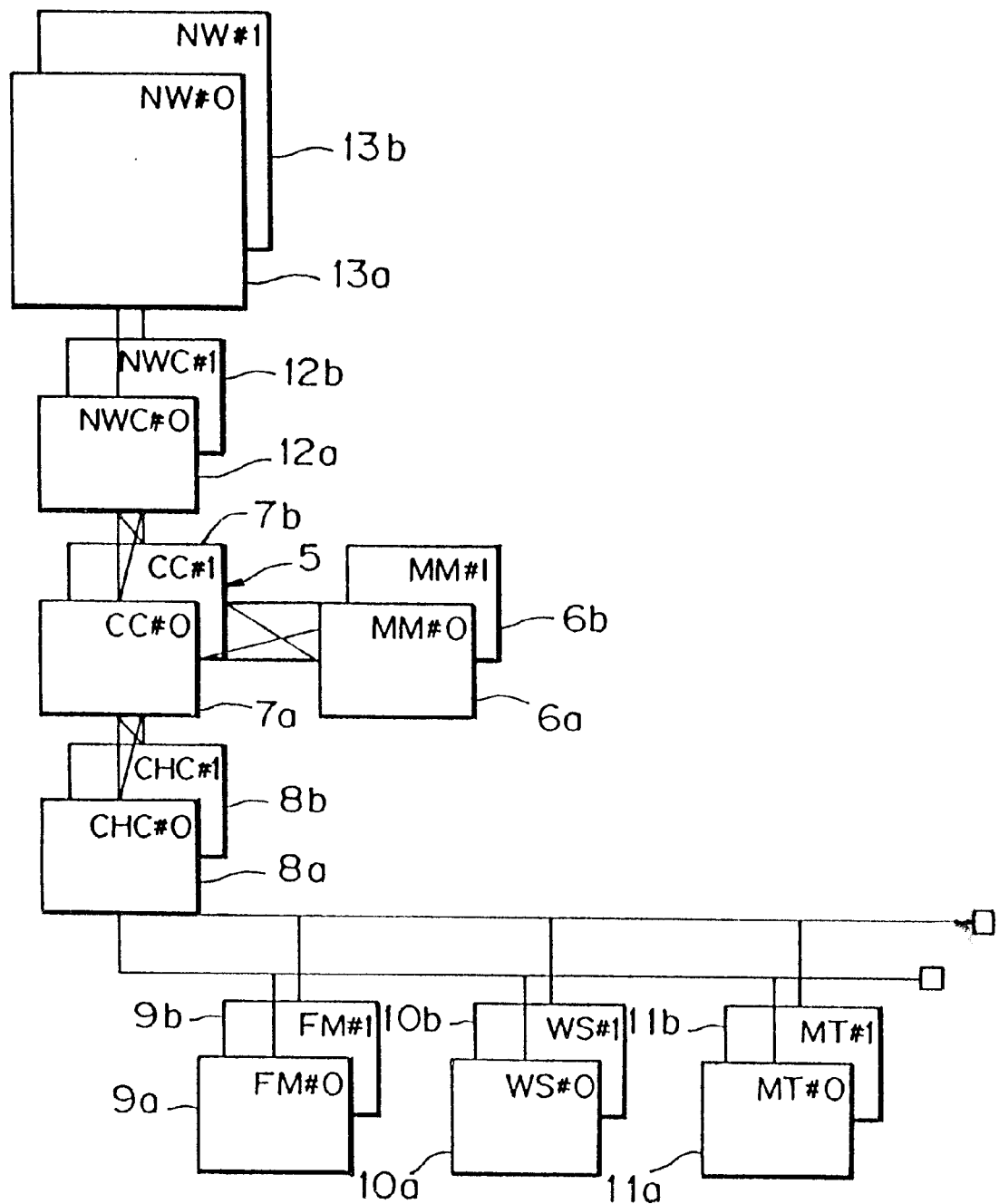
FIG. 2 is a block diagram of a digital switching system in which an information processing apparatus according to a preferred embodiment of the present invention is incorporated.

Referring now to FIG. 2, there is shown in block diagram a digital switching system in which an information processing apparatus to which the present invention is applied is incorporated. The digital switching system shown in FIG. 2 has a duplex hardware construction which includes two systems (denoted by #0 and #1) of components.

In particular, the digital switching system includes a pair of main memory apparatus (MM#0 and MM#1) 6a and 6b in which programs and data for operating the system are stored, and a pair of central processing units (CC#0 and CC#1) 7a and 7b for controlling the system in an integrated condition based on the programs and data from the main memory apparatus 6a and 6b, respectively. The main memory apparatus 6a and 6b and the central processing units 7a and 7b construct, for example, an electronic computer 5.

The digital switching system further includes a pair of channels (CHC#0 and CHC#1) 8a and 8b as input/output interfaces between the electronic computer 5 and the outside, and a pair of file memory apparatus (FM#0 and FM#1) 9a and 9b serving as external storage apparatus (auxiliary storage apparatus) in which the programs and data for operating the system are stored. The file memory apparatus 9a and 9b are each formed, for example, from a disk apparatus.

The digital switching system further includes a pair of maintenance work stations (WS#0 and WS#1) 10a and 10b, a pair of magnetic tape apparatus (MT#0 and MT#1) 11a and 11b, a pair of switching network control apparatus (NWC#0 and NWC#1) 12a and 12b, and a pair of switching networks (NW#0 and NW#1) 13a and 13b.

In operation of the digital switching system, when, for example, the system #0 operates as a currently operating system, the main memory apparatus 6a, central processing unit 7a, channel 8a, file memory apparatus 9a, maintenance work station 10a, magnetic tape apparatus 11a, switching network control apparatus 12a and switching network 13a operate, but when the system #1 operates as a currently operating system, the main memory apparatus 6b, central processing unit 7b, channel 8b, file memory apparatus 9b, maintenance work station 10b, magnetic tape apparatus 11b, switching network control apparatus 12b and switching network 13b operate.

In particular, the central processing unit 7a (7b) performs software processing in accordance with a program for operation of the system based on programs and/or data from the main memory apparatus 6a (6b) or the file memory apparatus 9a (9b), and the switching network 13a (13b) is controlled by the switching network control apparatus 12a (12b).

Accordingly, the electronic computer 5 which is constructed by the main memory apparatus 6a (6b) and the central processing unit 7a (7b) can be connected to another communication terminal accommodated in the switching network 13a (13b).

Figure 3:
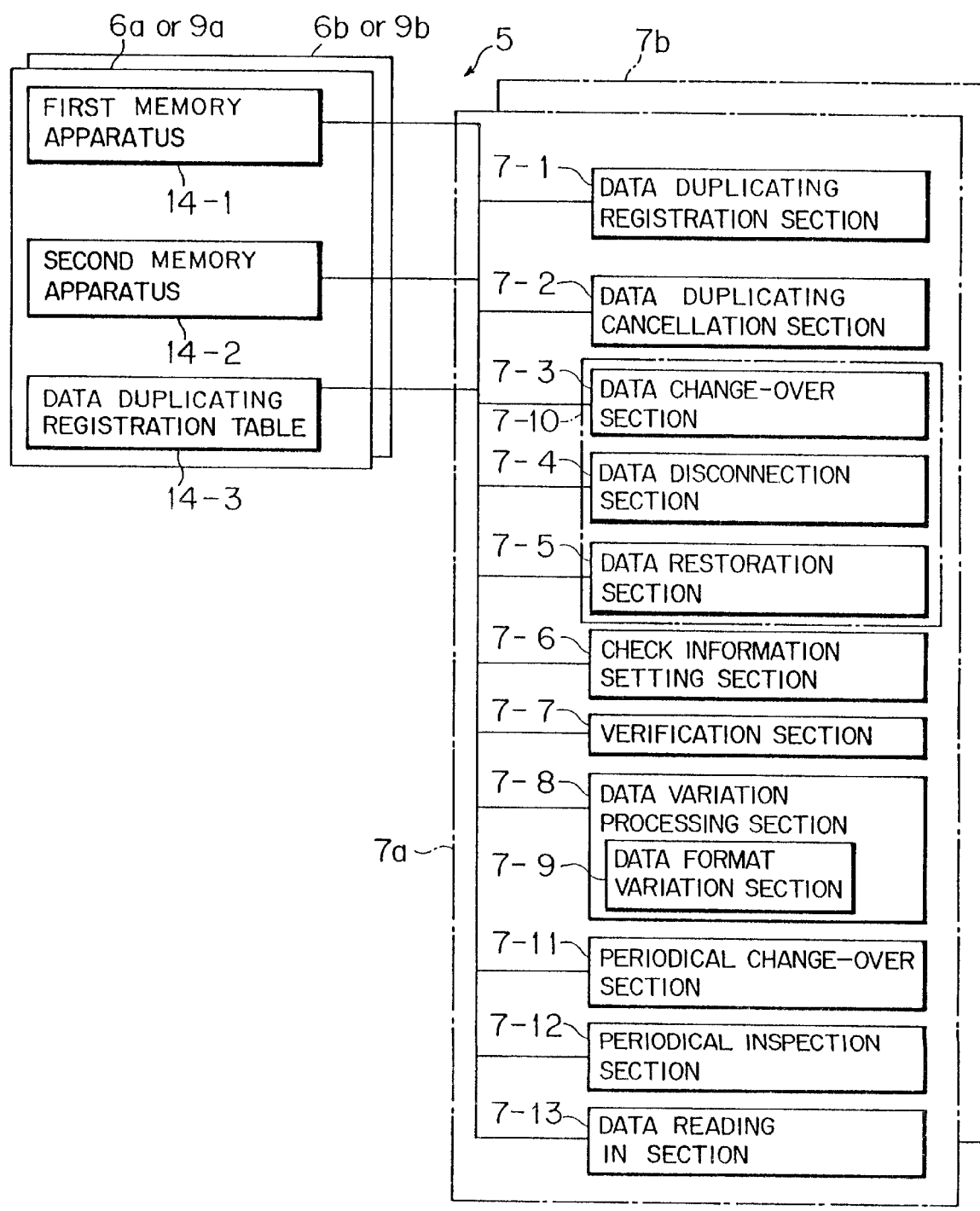
FIG. 3 is a functional block diagram showing the information processing apparatus shown in FIG. 2.

By the way, the central processing units 7a and 7b as well as the main memory apparatus 6a and 6b and the file memory apparatus 9a and 9b for storing programs and data to be used by the central processing units 7a and 7b described above have such functional constructions as seen in FIG. 3.

It is to be noted that, since the duplex components described above have similar constructions to each other, the following description is given of a case wherein the system #0 is used as a currently operating system.

In particular, referring to FIG. 3, each of the main memory apparatus 6a and the file memory apparatus 9a has functions as a first memory apparatus 14-1, a second memory apparatus 14-2 and a data duplicating registration table 14-3. Storage areas of the first memory apparatus 14-1, second memory apparatus 14-2 and data duplicating registration table 14-3 are distributed and secured under the control of the central processing unit 7a.

The first memory apparatus 14-1 stores original data (including a program) to be used in software processing. The second memory apparatus 14-2 stores preliminary data which back up the original data and may be used in software processing similarly. The data duplicating registration table (storage table) 14-3 registers a relation between the original data and the preliminary data.

It is to be noted that original data here signifies originally given data which make an object of duplicating, and preliminary data signifies data produced by backing up the original data as duplicated data.

Meanwhile, the central processing unit 7a has functions as a data duplicating registration section 7-1, a data duplicating cancellation section 7-2, a data change-over section 7-3, a data disconnection section 7-4, a data restoration section 7-5, a check information setting section 7-6, a verification section 7-7, a data variation processing section 7-8, a periodical change-over section 7-11, a periodical inspection section 7-12 and a data reading in section 7-13, which will be described below.

The data duplicating registration section 7-1 which serves as data duplicating means distributes and secures storage areas of the first memory apparatus 14-1, the second memory apparatus 14-2 and the data duplicating registration table 14-3.

More particularly, the data duplicating registration section 7-1 stores and registers preliminary data, which back up arbitrary data (original data) to be used in software processing of the information processing apparatus, into the second memory apparatus 14-2 automatically or in response to a command inputted by an operator.

Figure 4:
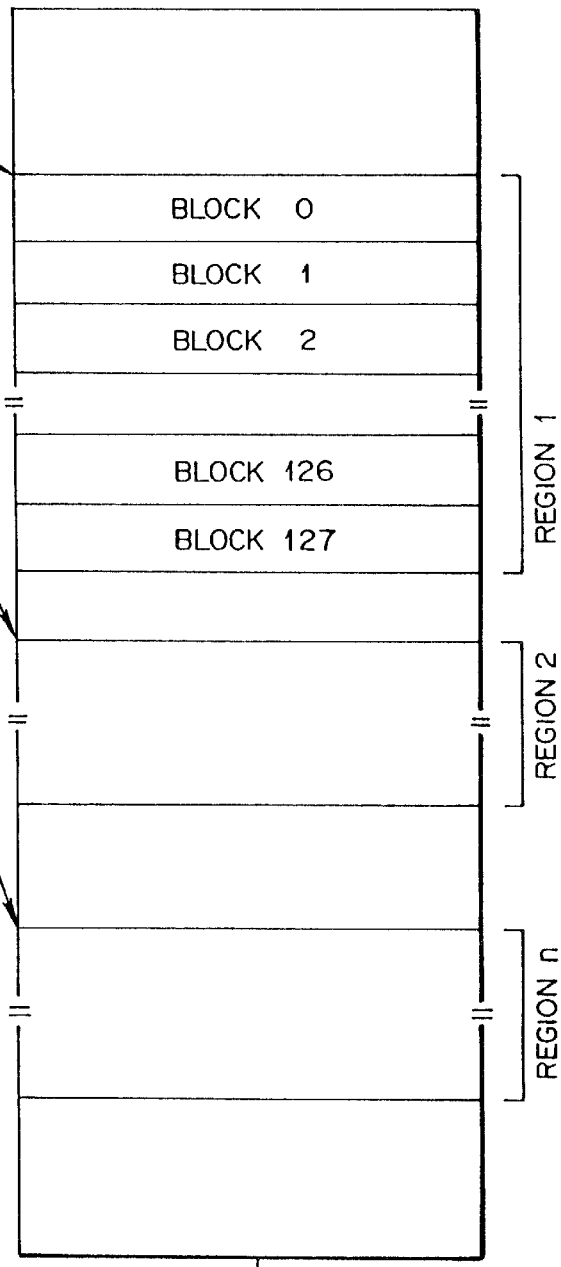
FIG. 4 is a diagrammatic view showing a format of preliminary data registered in a second storage apparatus of the information processing apparatus of FIG. 3.

For example, if original data stored in the first memory apparatus 14-1 which are to be backed up are designated, then preliminary data are registered in such a format as shown in FIG. 4 into the second memory apparatus 14-2 by the data duplicating registration section 7-1, which will be hereinafter described, to define duplicating of the designated data.

In particular, referring to FIG. 4, the second memory apparatus 14-2 is divided, for example, into unit regions of 1 Mbyte each including 128 blocks into which preliminary data should be stored, and the address and the size of a preliminary data region to be registered are controlled by a preliminary data storage region address table 14-2a while the occupations of the preliminary data regions, that is, whether the preliminary data regions are busy or idle, are controlled by a preliminary data storage region busy/idle table 14-2b.

Further, top addresses of individual regions each formed from 128 blocks are recorded in the preliminary data storage region address table 14-2a. Meanwhile, the preliminary data storage region busy/idle table 14-2b is constructed such that an busy/idle bit F of 1 bit is provided for each block of each region. For example, when the busy/idle bit F is "0", this signifies that the block is in use or occupied, but when the busy/idle bit F is "1", this signifies that the block is empty or free.

It is to be noted that, while a second memory apparatus 14-2 to be used can be selected arbitrarily from between the main memory apparatus 6a and the file memory apparatus 9a based on data, each of the main memory apparatus 6a and the file memory apparatus 9a has prepared therefor a preliminary data storage region address table 14-2a for controlling address information of regions of the apparatus and a preliminary data storage region busy/idle table 14-2b for controlling the storage regions of the second memory apparatus 14-2.

Consequently, upon data duplicating registration, if registration has been performed successfully, then the success in registration is notified to the operator, but if a region for production of preliminary data cannot be secured based on information stored in the preliminary data storage region busy/idle table 14-2b, the result, that is, failure in registration, is notified to the operator.

In addition to such storage and registration of preliminary data into the second memory apparatus 14-2 as described above, the data duplicating registration section 7-1 stores and registers a relation between the original data and the preliminary data in such a format as shown in FIG. 5 into the data duplicating registration table 14-3.

It is to be noted that information regarding original data which make an object of recording as preliminary data, that is, information of an original data registration apparatus number, an original data registration apparatus internal address, an original data size, a pointer (or registration number) to an original data reading in routine, another pointer (or registration number) to an original data writing in routine and a further pointer (or registration number) to an original data conversion routine, is registered in advance in the data duplicating registration table 14-3.

In particular, as seen in FIG. 5, a relation between original data and preliminary data is registered as registration data in a region 14-3B in a table 14-3, which is located at the address indicated by a region 14-3A, where the value of the region 14-3A is a registration number multiplied by 16.

Contents of registration data to be registered here are: such a data state number as illustrated in FIG. 7, which will be hereinafter described, of preliminary data and original data is applied to a top block; and information regarding a preliminary data registration apparatus number, a preliminary data registration apparatus internal address, a preliminary data size, a pointer (or registration number) to the preliminary data reading in routine, a pointer (or registration number) to the preliminary data writing in routine and a pointer (or registration number) to the preliminary data conversion routine, which construct registration data based on registration numbers on the data duplicating registration table 14-3 applied to registered original data, is registered together with information regarding the original data. Consequently, preliminary data information relating to original data registered in advance can be stored.

It is to be noted that, as hereinafter described, the preliminary data reading in routine is processing for reading in preliminary data of the second memory apparatus 14-2 while the preliminary data writing in routine is processing for writing data into the second memory apparatus 14-2.

Further, the preliminary data registration apparatus number mentioned above is a number for identification between the main memory apparatus 6a and the file memory apparatus 9a. For example, as the preliminary data registration apparatus number, the number "0" can be registered for the main memory apparatus 6a whereas the number "1" is registered for the file memory apparatus 9a as seen in FIG. 6.

Meanwhile, as the state number for original data and preliminary data stored in the top block of the registration data region 14-3B of the data duplicating registration table 14-3 mentioned above, for example, the number "0" can be set to a non-registered state, the number "1" can be set to a disconnected state, the number "2" can be set to an in-service operation proceeding state, the number "3" can be set to a stand-by state, and the number "4" can be set to a currently used state.

Here, the non-registered state is a state in which original data and preliminary data are not registered in a duplicated condition; the disconnected state is a state in which original data and preliminary data are registered in a duplicated condition, but are not used in actual processing, and this state prevents direct transition of the state of data to the currently used state; the in-service operation proceeding state is a state in which in-service operation of data from the disconnected state to the stand-by state (or the currently used state) is proceeding; the stand-by state is a state from which data can enter the currently used state; and the currently used state is a state in which software processing is being executed for data.

The data duplicating cancellation section 7-2 which serves as data duplicating cancellation means cancels the information representing that original data and preliminary data are stored in a relating condition in the data duplicating registration table 14-3. In other words, the data duplicating cancellation section 7-2 cancels duplicating registration corresponding to data designated by a registration number and deletes the preliminary data.

The data change-over section 7-3 which serves as data change-over means sets, automatically or in response to a command inputted by an operator, one of original data stored in the first memory apparatus 14-1 and preliminary data stored in the second memory apparatus 14-2 as currently used data which are currently used in software processing. Further, the data change-over section 7-3 changes over the original data and the preliminary data under a predetermined condition in order to use the other of the original data and the preliminary data as stand-by state data (preliminary state data) which have the same contents as the currently used data and can always back up the currently used data.

In other words, the data change-over section 7-3 rewrites the state number of original data or preliminary data recorded in the top block of the registration data region 14-3B of the data duplicating registration table 14-3 from the number "3" of the stand-by state to the number "4" of the currently used state or from the number "4" of the currently used state to the number "3" of the stand-by state. Consequently, the data change-over section 7-3 can perform changing over of the stand-by state data to the currently used data or changing over of the currently used data to the stand-by state data.

The data disconnection section 7-4 which serves as data disconnection means disconnects currently used data and stand-by state data from each other.

In other words, the data disconnection section 7-4 rewrites the state number of original data or preliminary data stored in the top block of the registration data region 14-3B of the data duplicating registration table 14-3 from the number "3" of the stand-by state or the number "4" of the currently used state to the number "1" of the disconnected state so as to achieve transition from the stand-by state which allows backing up of original data to the disconnected state which does not allow backing up of original data.

The data restoration section 7-5 which serves as data restoration means restores, after currently used data and stand-by state data are disconnected from each other by the data disconnection section 7-4, the relation of the currently used data and the stand-by state data between the original data and the preliminary data, that is, to place the data in the disconnected state into the stand-by state (or currently used state).

Accordingly, a data state control section 7-10 for controlling the states of original data and preliminary data (among the non-registered state, disconnected state, in-service state, stand-by state and currently used state) is formed from the data duplicating registration section 7-1, data duplicating cancellation section 7-2, data change-over section 7-3, data disconnection section 7-4 and data restoration section 7-5 described above. Thus, after operation of the system is started, flexible duplex control according to a degree of reliability required for data is performed by the data state control section 7-10.

Further, as described hereinabove, where the state numbers of original data and preliminary data are set in such a manner as seen in FIG. 7, the data state changes in such a manner as seen in FIG. 8 by the data state control of the data state control section 7-10.

In particular, as seen from FIG. 8, when duplicating registration of data is to be performed by the data duplicating registration section 7-1, this is applied to data whose state is the non-registered state ("0"). The data thus registered become preliminary data in the disconnected state.

When duplicating cancellation of data by the data duplicating cancellation section 7-2 is to be performed, this is applied to data whose state is the disconnected state ("1"). The duplicating cancellation places preliminary data into the non-registered state ("0").

If in-service operation in data of the disconnected state ("1") into the stand-by state (or currently used state) by the data restoration section 7-5 is started, then the data state changes to the in-service operation proceeding state ("2").

Further, if in-service operation processing for data in the in-service operation proceeding state by the data restoration section 7-5 is completed, then the state of the data changes to the stand-by state ("3") (or currently used state ("4")).

Further, by the state control of currently used data and stand-by state data by the data change-over section 7-3, the stand-by state data ("3") change to currently used data "4" whereas the currently used data ("4") change to stand-by state data ("3").

On the other hand, when data disconnection control by the data disconnection section 7-4 is to be performed, this is applied to data whose data state is the in-service operation proceeding state ("2"), the stand-by state ("3") or the currently used state ("4"). The data for which the disconnection control has been performed enters the disconnected state ("1").

The check information setting section 7-6 which serves as check information setting means performs, for example, function calculation or the like for currently used data and stand-by state data to set a check sum as check information.

Figure 9:
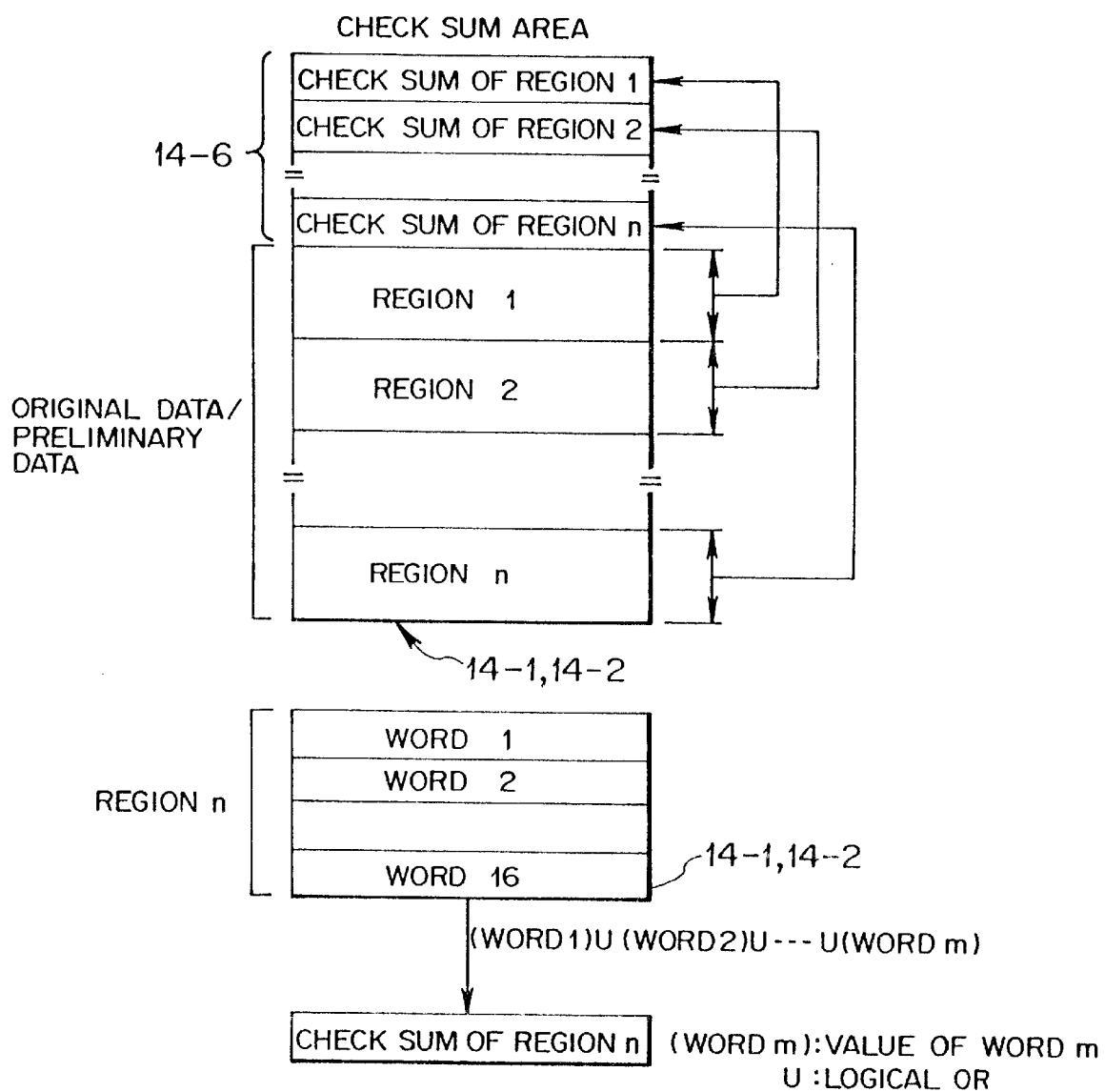
FIG. 9 is a diagrammatic view illustrating a setting method for a check sum by a check information setting section of the information processing apparatus of FIG. 3.

In particular, referring to FIG. 9, where original data stored in the first memory apparatus 14-1 or preliminary data stored in the second memory apparatus 14-2 are composed of n regions each including 16 words (one word is formed from bit information of 32 bits), a result of logical ORing of original data (or preliminary data) of 16 words for each region is stored as a check sum into a check sum area 14-6.

The verification section 7-7 which serves as verification means verifies, when software processing is to be executed using currently used data, normality of the currently used data using check sums from the check information setting section 7-6. In other words, when currently used data are to be accessed, contents of the currently used data are verified based on check sums set by the check information setting section 7-6 described above.

Figure 10:
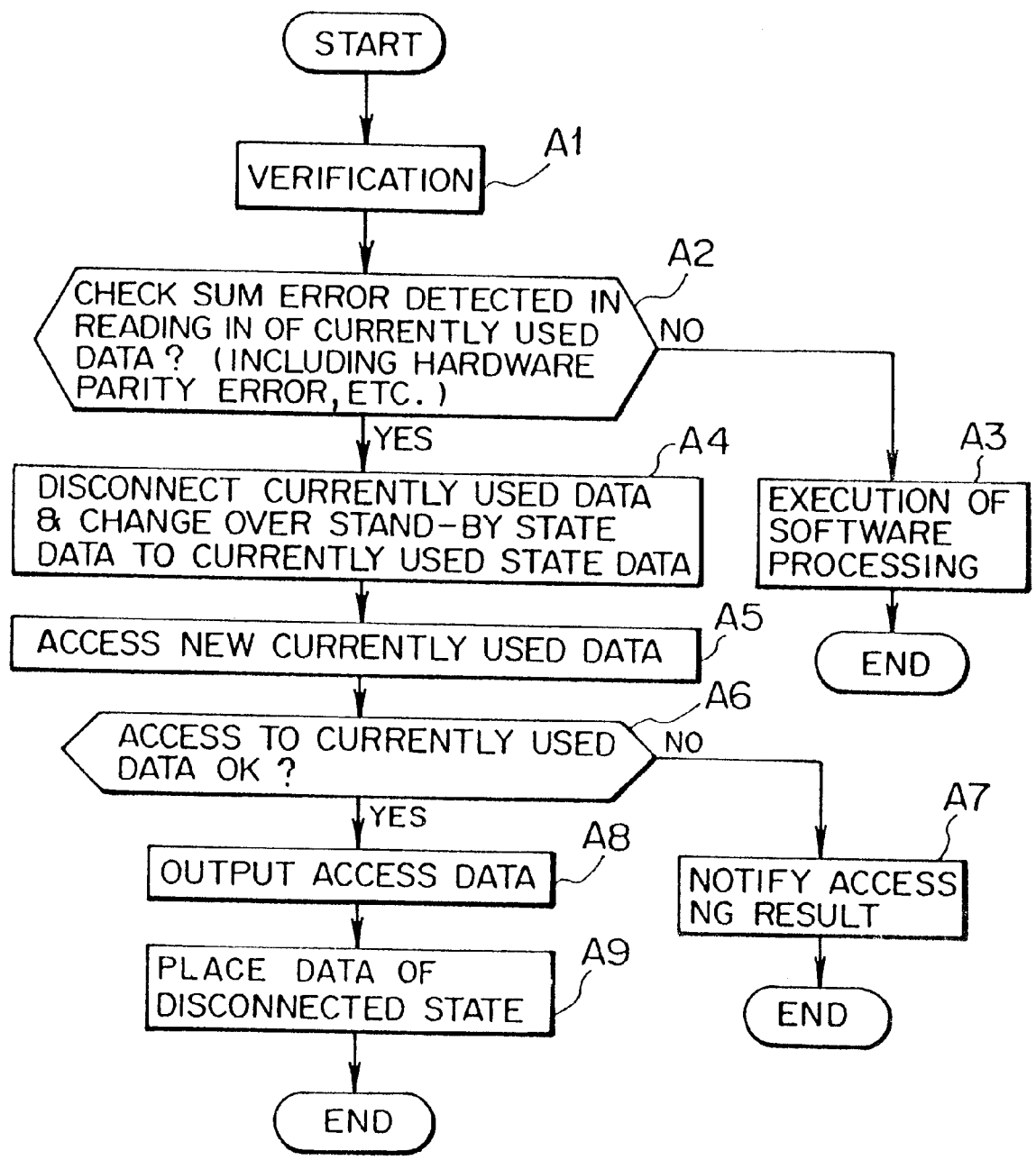
FIG. 10 is a flow chart illustrating a control procedure for a data state based on a result of verification by a verification section of the information processing apparatus of FIG. 3.

More particularly, referring to the flow chart of FIG. 10, the verification section 7-7 compares a check sum set by the check information setting section 7-6 and a result of logical ORing of all data of a region in which data to be accessed are stored with each other to detect whether they are same as or different from each other in order to verify the normality of the data (step A1).

When no abnormality is detected from the currently used data by the verification section 7-7, the currently used data are read in, and software processing is executed using the thus read in data (from the NO route of step A2 to step A3).

On the other hand, if abnormality is detected from the currently used data, then the data change-over section 7-3 changes over the stand-by state data to the currently used state data while the data disconnection section 7-4 disconnects the former currently used data from which the abnormality has been detected (from the YES route of step A2 to step A4).

Then, the new currently used data after the changing over by the data change-over section 7-3 are accessed (step A5). However, if the accessing results in failure, a notification that the result of accessing is NG (No Good) is issued (from the YES route of step A6 to step A7). On the contrary if the accessing results in success, access data are read in and outputted (step A8), whereafter the data restoration section 7-5 places the data in the disconnected condition into the stand-by state data (step A9). Thereafter, the software processing can be executed using the stand-by state data.

The data variation processing section 7-8 which serves as data variation processing means performs data variation processing for currently used data and simultaneously performs the same data variation processing for stana-by state data.

Figure 11:
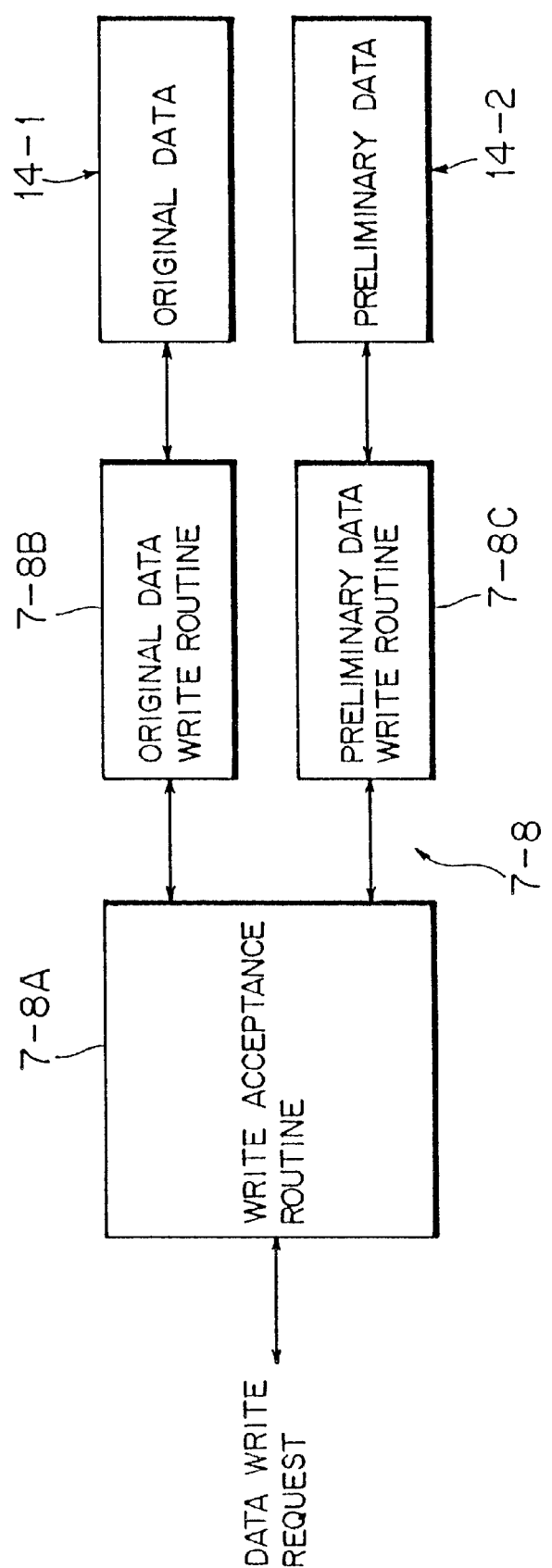
FIG. 11 is a block diagram illustrating operation of a data variation processing section of the information processing apparatus of FIG. 3.

In other words, the data variation processing section 7-8 performs variation for currently used data, whose data state is controlled by the data state control section 7-10 described above, also for stand-by state data simultaneously. To this end, the data variation processing section 7-8 includes, as seen in FIG. 11, a write acceptance routine 7-8A for accepting writing of duplicated data, and an original data write routine 7-8B and a preliminary data write routine 7-8C for converting and writing inputted original data and preliminary data, respectively.

In particular, a request for variation of duplicating data is first inputted to the write acceptance routine 7-8A. The write acceptance routine 7-8A checks states of original data and preliminary data and, only when they are currently used data or stand-by state data, the write acceptance routine 7-8A transfers inputted data to the original data write routine 7-8B or the preliminary data write routine 7-8C to perform variation of the data. Consequently, the inputted data can be reflected on both of the currently used data and the stand-by state data simultaneously.

It is to be noted that the data variation processing section 7-8 described above has a routine for accessing the main memory apparatus 6a when data are arranged in the main memory apparatus 6a and another routine for accessing the file memory apparatus 9a when data are arranged in the file memory apparatus 9a.

Further, in the original data write routine 7-8B and the preliminary data write routine 7-8C described above, each time new data are written in, the check information setting section 7-6 produces a check sum corresponding to the new data.

Further, the form of information to be inputted to the data variation processing section 7-8 can be designated in conformity with the original data write routine 7-8B and the preliminary data write routine 7-8C.

The data variation processing section 7-8 includes a data format variation section 7-9 which serves as data format variation means for performing, upon data variation processing for stand-by state data, for stand-by state data, data variation processing simultaneously with and substantially same as the data variation processing for currently used data described above although the format is different.

For example, when the data variation processing section 7-8 varies certain stand-by state data to "1", the data format variation section 7-9 varies the stand-by state data to substantially same data "01" although the format of the data is different.

Figures 12A, 12B:
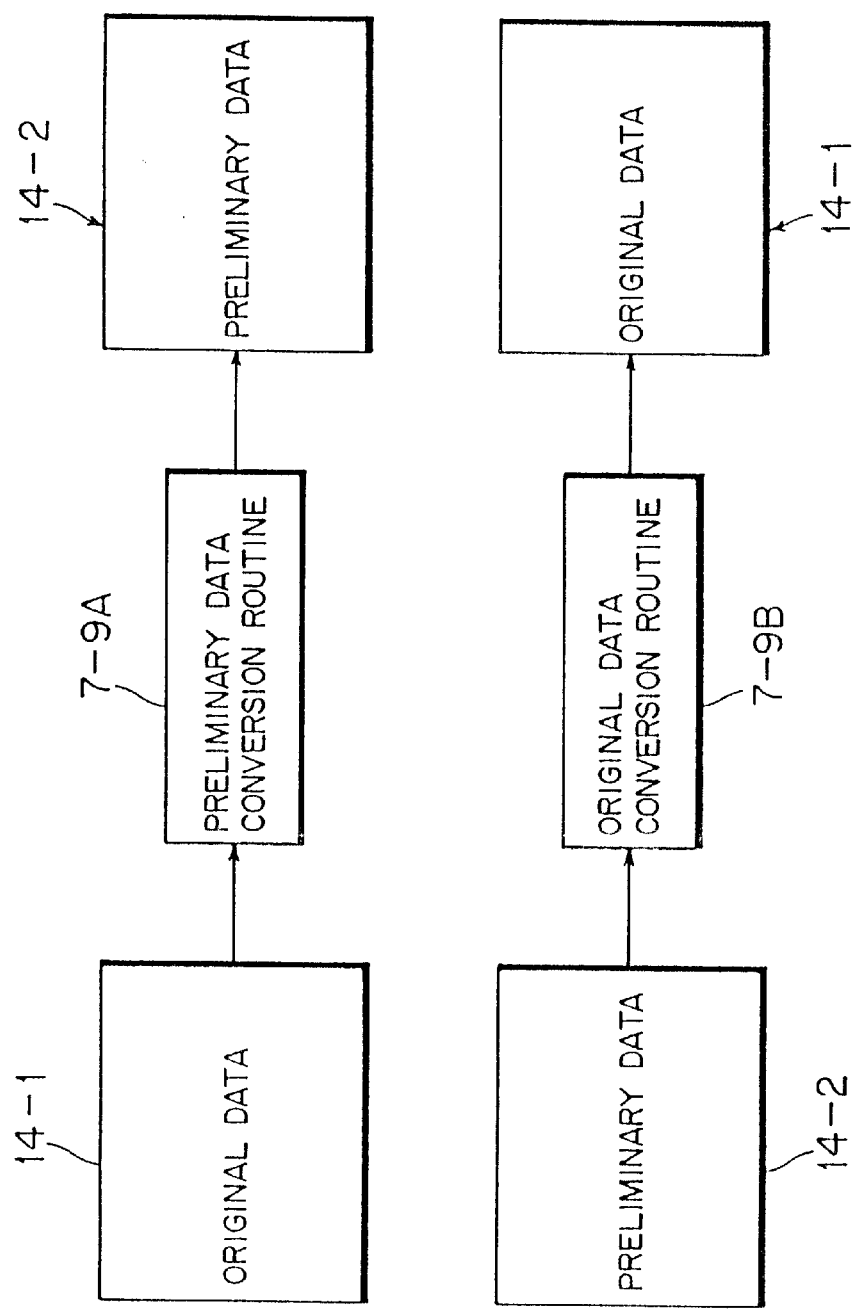
FIGS. 12(a) and 12(b) are block diagrams illustrating operation of a data format variation section of the information processing apparatus of FIG. 3.

The data format variation section 7-9 includes, for example, as seen in FIGS. 12(*a*) and 12(*b*), a preliminary data conversion routine 7-9A for conversion from original data to preliminary data and an original data conversion routine 7-9B for conversion from reliminary data into original data.

Thus, the processing to change (incorporate) preliminary data in a disconnected condition into data of the stand-by state by the data restoration section 7-5 is performed by successively reading in original data from the first memory apparatus 14-1, outputting the data to the preliminary data conversion routine 7-9A and storing the output of the preliminary data conversion routine 7-9A then as preliminary data into the second memory apparatus 14-2.

Figure 13:
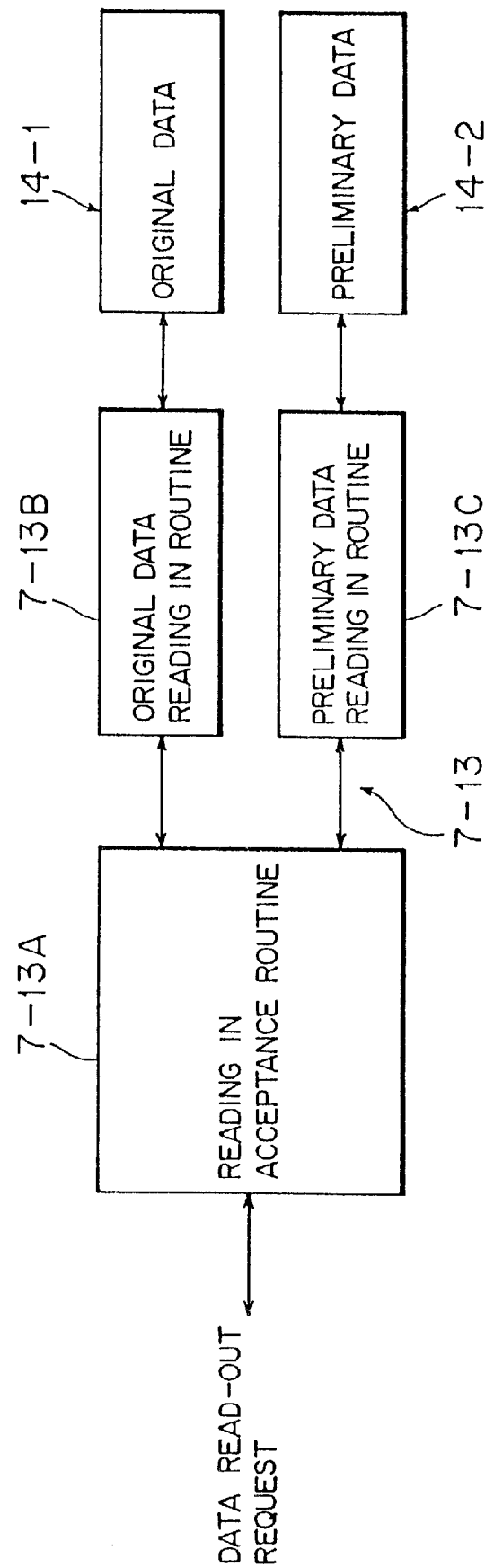
FIG. 13 is a block diagram illustrating operation of a data reading in section of the information processing apparatus of FIG. 3.

The data reading in section 7-13 reads in data of a designated one of the currently used state and the stand-by state. To this end, the data reading in section 7-13 includes, as seen in FIG. 13, a reading in acceptance routine 7-13A for accepting reading in of duplicated data, an original data reading in routine 7-13B for converting data inputted for each original data and reading in resulting data, and a preliminary data reading in routine 7-13C for converting data inputted for each preliminary data and reading in resulting data.

In particular, a request to read in data from duplicated data is first inputted to the reading in acceptance routine 7-13A. The reading in acceptance routine 7-13A first checks a designated state of data to be read in and, when the designated state of data to be read in is the currently used state or the stand-by state, the reading in acceptance routine 7-13A checks the state of original data or preliminary data of the data duplicating registration table 14-3 and starts one of the original data reading in routine 7-13B and the preliminary data reading in routine 7-13C which is in the designated state in order to read in the data.

It is to be noted that also the data reading in section 7-13 described above can be arranged in the main memory apparatus 6a or the file memory apparatus 9a by using, when data are arranged in the main memory apparatus 6a, the routine for accessing the main memory apparatus 6a, but using, when data are arranged in the file memory apparatus 9a, the routing for accessing the file memory apparatus 9a.

Further, also the form of information to be inputted to the data reading in section 7-13 can be designated in conformity with the original data reading in routine 7-13B and the preliminary data reading in routine 7-13C.

The periodical change-over section 7-11 changes over the relationship between the currently used state and the stand-by state periodically in order to confirm the normality of stand-by state data. For example, the periodical change-over section 7-11 is started by fixed time start control for starting a program at a designated point of time of software so that the state is changed over in response to a change-over control type between the currently used state and the stand-by state of the data state control section 7-10.

Figure 14:
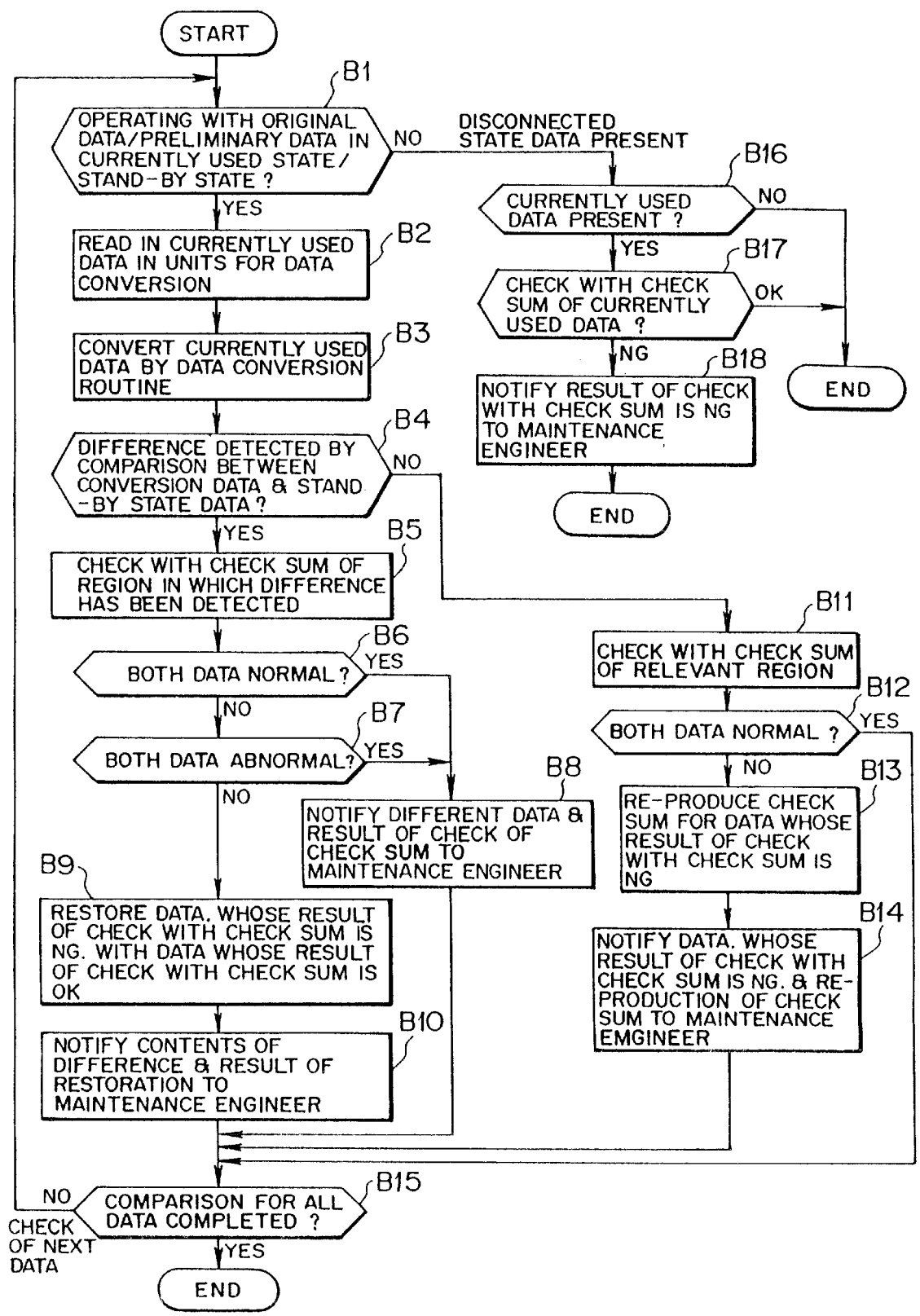
FIG. 14 is a flow chart illustrating operation of a periodic inspection section of the information processing apparatus of FIG. 3.

The periodical inspection section 7-12 periodically checks (verifies), for example, as illustrated in the flow chart of FIG. 14, data including currently used data and stand-by state data and check sums of the data to discriminate whether or not the currently used data and the stand-by state data are abnormal in order to confirm the normality of the currently used data and the stand-by state data. If some abnormal data is detected, the thus detected abnormal data is recovered with normal data.

In particular, when the first memory apparatus 14-1 or the second memory apparatus 14-2 is operating while original data or preliminary data stored in it are in the currently used state or the stand-by state, the data reading in section 7-13 reads in the currently used data in units of a data amount by which data conversion is performed (from the YES route of step B1 to step B2).

Then, the currently used data thus read in are converted by the data conversion routine 7-9A (or 7-9B) of the data format variation section 7-9 (step B3).

Then, the data obtained by the conversion by the data format variation section 7-9 described above and the stand-by state data are compared with each other. Here, if some difference is detected, then the currently used data and the stand-by state data are checked for abnormality using check sums of the region in which the difference is detected (from the YES route of step B4 to step B5).

If the check based on check sums in step B5 described above reveals that both of the currently used data and the stand-by state data are normal or abnormal, the different data, the check sums and the result of the check are notified to a maintenance engineer, for example, via the maintenance work station 10a (from the YES route of step B6 or the YES route of step B7 to step B8).

On the other hand, if it is determined that one of the currently used data and the stand-by state data is normal (the result of the check with check sums proves OK), the data with which the result of the check with check sums is NG is restored with data with which the result of the check with check sums is OK (from the NO route of step B7 to step B9). Then, contents regarding the other data with which the difference has been determined and a result of the restoration are notified to an operator not shown (step B10).

By the way, when the comparison in step B4 between the data obtained by the conversion by the data format variation section 7-9 and the stand-by state data described above reveals that no difference is found, abnormality of the currently used data and the stand-by state data is checked only with check sums in the region for which the conversion has been performed (from the NO route of step B4 to step B11).

If the check for abnormality of the currently used data and the stand-by state data in step B11 reveals that both of the data are abnormal, check sums are re-produced using the data which have been determined abnormal by the check (from the NO route of step B12 to step B13), and it is notified to the maintenance engineer, for example, via the maintenance work station 10a that data and check sums are reproduced for the data which have been determined to be abnormal by the check (step B14).

After the notification to the maintenance work station 10a in step B10 or B14 is performed or when the check in step B12 with check sums reveals that both data are normal, it is discriminated whether or not the comparison of currently used data and stand-by state data has been performed for all data (step B15). If the comparison has not been performed for all data (NO route of step B15), then the control sequence returns to step B1 so that such comparison between the remaining currently used data and stand-by state data is repeated until the comparison is completed for all data.

On the other hand, when the first memory apparatus 14-1 or the second memory apparatus 14-2 is not operating while original data or preliminary data stored in it are in the currently used state or the stand-by state, it is discriminated in step B1 that the original data or the preliminary data include some disconnected state data (NO route in step B1).

When it is discriminated in step B1 that the original data or the preliminary data include some disconnected state data, if no currently used data are present, then the processing is ended (NO route in step B16). However, if currently used data are present, then checking of the currently used data with check sums is performed (from the YES route of step B16 to step B17). Then, if a result of the checking is OK, then the processing is ended (NO route of step B17). But on the contrary, if the result of the checking is NG, this is notified to the maintenance engineer via the maintenance work station 10a (step B18).

In the information processing apparatus of the embodiment of the present invention having the construction described above, the following data processing is performed.

In particular, in the electronic computer 5 which is connected to and can communicated with another communication terminal accommodated in the switching network 13a, software processing can be performed using required data stored in the main memory apparatus 6a and the file memory apparatus 9a.

Original data to be used in software processing are stored in the first memory apparatus 14-1 of the main memory apparatus 6a or the file memory apparatus 9a while preliminary data which back up the original data and can be used in software processing similarly are stored in the second memory apparatus 14-2. The states of the data stored in the first memory apparatus 14-1 and the second memory apparatus 14-2 are controlled in the following manner.

In particular, the data duplicating registration section 7-1 can register a relation between the original data and the preliminary data into the data duplicating registration table 14-3 while the data duplicating cancellation section 7-2 can cancel the relation between the original data and the preliminary data. A result of the registration of the data duplicating registration section 7-1 or a result of the cancellation of the data duplicating cancellation section 7-2 is notified to an operator.

The data change-over section 7-3 uses one of the original data and the preliminary data as currently used data which are currently used in software processing and uses the other of the original data and the preliminary data as stand-by state data which can always back up the currently used data with the same data contents as the currently used data to establish a software duplex condition of the data stored in the main memory apparatus 6a and the file memory apparatus 9a.

Further, the data change-over section 7-3 performs changing over of the currently used data and the stand-by state data automatically or in response to a command inputted via the maintenance work station 10a and executes software processing using the data after the change-over.

The data disconnection section 7-4 changes the state of the original data or the preliminary data stored in the data duplicating registration table 14-3 to disconnect the currently used data and the stand-by state data from each other. The data restoration section 7-5 changes the state of the original data or the preliminary data in a relating condition in the data duplicating registration table 14-3 again to restore the relation of the currently used data and the stand-by state data between the original data stored in the first memory apparatus 14-1 and the preliminary data stored in the second memory apparatus 14-2.

Further, when the currently used data are accessed, the verification section 7-7 verifies contents of the currently used data with check sums set by the check information setting section 7-6 described above. Here, when no abnormality is detected from the currently used data, software processing is executed using the currently used data. However, if some abnormality is detected from the currently used data, then software processing is executed using the stand-by state data.

If normality of the data is confirmed by the verification section 7-7 described above, then designated data are read in by the data reading in section 7-13. Then, when writing of the currently used data is performed, the same data variation processing is performed simultaneously for the stand-by state data by the data variation processing section 7-8.

Further, when data variation processing is performed by the data format variation section 7-9 of the data variation processing section 7-8, the substantially same data variation processing is performed for the stand-by state data although the format is different.

It is to be noted that the periodical change-over section 7-11 performs changing over of the relation of the currently used state and the stand-by state periodically in order to confirm the normality of the stand-by state data, and periodically checks (verifies) the currently used data and the stand-by state data as well as check sums of them in order to detect abnormality of the currently used data and the stand-by state data.

By the way, in an initial state of the digital switching system described hereinabove with reference to FIG. 2, for example, data (including a program) for starting the system are not stored in the main memory apparatus 6a (or 6b) but are stored in the file memory apparatus 9a (or 9b).

Therefore, processing of picking up data for starting the system from the file memory apparatus 9a (or 9b) to the main memory apparatus 6a (or 6b), that is, storing the data into the main memory apparatus 6a (or 6b), is performed. This picking up processing is performed in the following manner (also in the following description, the system #0 is a currently used system similarly as in the foregoing description).

First, for example, data (including a program) for starting the system stored in the first memory apparatus 14-1 of the file memory apparatus 9a, that is, in the file memory apparatus 9a, are determined as original data while data (including a program) for starting the system stored in the second memory apparatus 14-2 of the main memory apparatus 6a, that is in the main memory apparatus 6a, are determined as preliminary data.

Further, upon initialization of the system, the data duplicating registration section 7-1 defines those of the original data stored in the file memory apparatus 9a which are required to be picked up into the main memory apparatus 6a, for example, by designation by an operator or the like.

Then, the data duplicating registration section 7-1 registers the original data defined to be picked up into the main memory apparatus 6a as data to be duplicated and stores the data as preliminary data into the main memory apparatus 6a.

Further, the data restoration section 7-5 incorporates the data stored as the preliminary data which are in a disconnected state in the main memory apparatus 6a as stand-by state data.

Thereafter, the data change-over section 7-3 changes over the data stored in the main memory apparatus 6a which have been put into a stand-by state to currently used data and changes over the data stored in the file memory apparatus 9a to stand-by state data.

Consequently, when the system is to be started after completion of the initialization, the central processing unit 7a can access the data stored in the main memory apparatus 6a as currently used data.

In this manner, with the information processing apparatus according to the embodiment of the present invention described above, since the first memory apparatus 14-1, second memory apparatus 14-2 and data duplicating registration table 14-3 are provided in the main memory apparatus 6a or the file memory apparatus 9a and the central processing unit 7a includes the data duplicating registration section 7-1, data duplicating cancellation section 7-2, data change-over section 7-3, data disconnection section 7-4 and data restoration section 7-5, data stored in the main memory apparatus 6a or the file memory apparatus 9a can be put into a duplex condition in software to enhance the reliability of data without using specific backing up hardware. Further, since the state of data can be controlled, even if operation of the system is started, the reliability of data can be enhanced flexibly in accordance with a degree of reliability required for the data.

Further, since the check information setting section 7-6 and the verification section 7-7 are provided, abnormality of currently used data can be detected. Consequently, when abnormality is detected, if the stand-by state data are used in place of the currently used data, then an otherwise possible malfunction of the system is eliminated. Accordingly, the reliability of data is enhanced remarkably.

Furthermore, if the data variation processing section 7-8 (or data format variation section 7-9) performs data variation processing for the currently used data, then the same data variation processing (or substantially same data variation processing although the format is different) is performed for the stand-by state data simultaneously. Consequently, the operator need not get aware of the circumstances in the electronic computer 5 and can therefore perform its operation readily.

It is to be noted that, while the foregoing detailed description of the present embodiment relates to a case wherein, in operation of the system, for example, the system #0 operates as a currently operating system, also when the system is changed over so that the system #1 operates as a currently operating system, data stored in the main memory apparatus 6b and the file memory apparatus 9b can be put into a duplex condition in software in a similar manner as described above.

Further, while, in the embodiment described above, original data and preliminary data are stored in a relating condition in the data duplicating registration table 14-3 and a duplex condition is established by changing over between currently used data and stand-by state data, the changing over is not limited to a duplex condition, and data may be stored in any other duplicated condition such as, for example, a triplex condition or a quadruple condition.

For example, in order to construct the system as a triplex system, two kinds of preliminary data including first preliminary data and second preliminary data may be employed as data to be stored into the second memory apparatus 14-2, and original data and such first and second preliminary data may be stored in a relating condition to each other. In this manner, a plurality of kinds of preliminary data may be employed as data to be stored into the second memory apparatus 14-2, and original data and the plurality of kinds of preliminary data may be stored in a relating condition to each other.

c. Modification to the Embodiment

The information processing apparatus (refer to FIG. 2) applied to the digital switching system described above may be modified such that it additionally includes a program starting section 7-14 and/or a data writing working section 7-15, which will be described below, and the data state control section 7-10 performs such a controlling operation as to change over data which are in a disconnected condition as currently used data and simultaneously disconnect data which are in a currently used condition to achieve instantaneous exchanging of a switching program, which is in an operative condition, for another switching program as seen in FIGS. 15 to 18.

It is to be noted that, also in this instance, since the duplex main memory apparatus 6a and 6b, central processing units 7a and 7b, and file memory apparatus 9a and 9b have similar constructions to each other, functions only of the main memory apparatus 6a, central processing unit 7a and file memory apparatus 9a will be described in detail.

The program starting section 7-14 is provided in the central processing unit 7a, and accepts a starting request for a switching program and performs starting control of a switching program as currently used data stored in the main memory apparatus 6a or the file memory apparatus 9a.

The data writing working section 7-15 performs working such as writing for data stored in the main memory apparatus 6a or the file memory apparatus 9a.

The modified information processing apparatus having the construction described above can perform exchanging processing of a program as described below. It is to be noted that an old (or exchanged) program is stored in advance in the first memory apparatus 14-1 of the main memory apparatus 6a or the file memory apparatus 9a.

Figure 15:
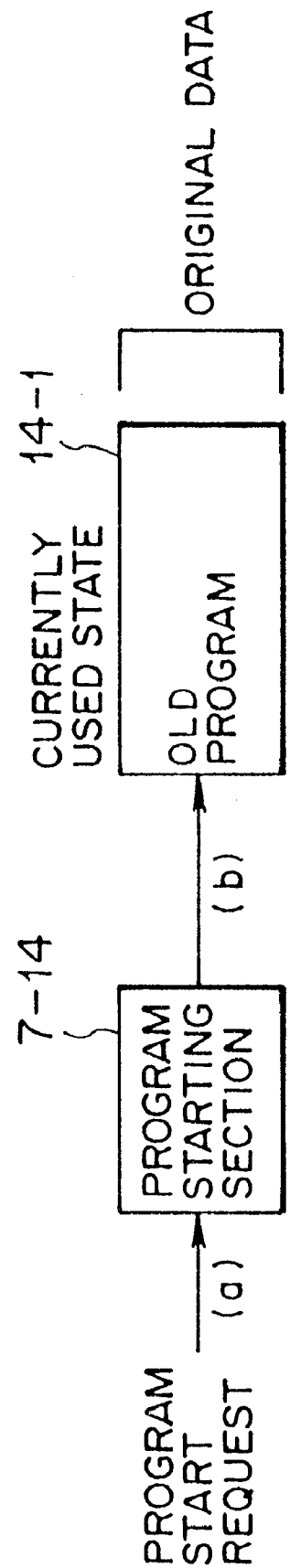
FIGS. 15 to 18 are block diagrams illustrating program exchanging processing by a modification to the information processing apparatus of FIG. 3.

First, if a starting instruction for a switching program is inputted to the program starting section 7-14 (refer to (a) in FIG. 15), then the program starting section 7-14 designates a data registration number to access the switching program (old(or exchanged)program) as original data stored in the first memory apparatus 14-1 to start the switching program (refer to (b) in FIG. 15).

Figure 16:
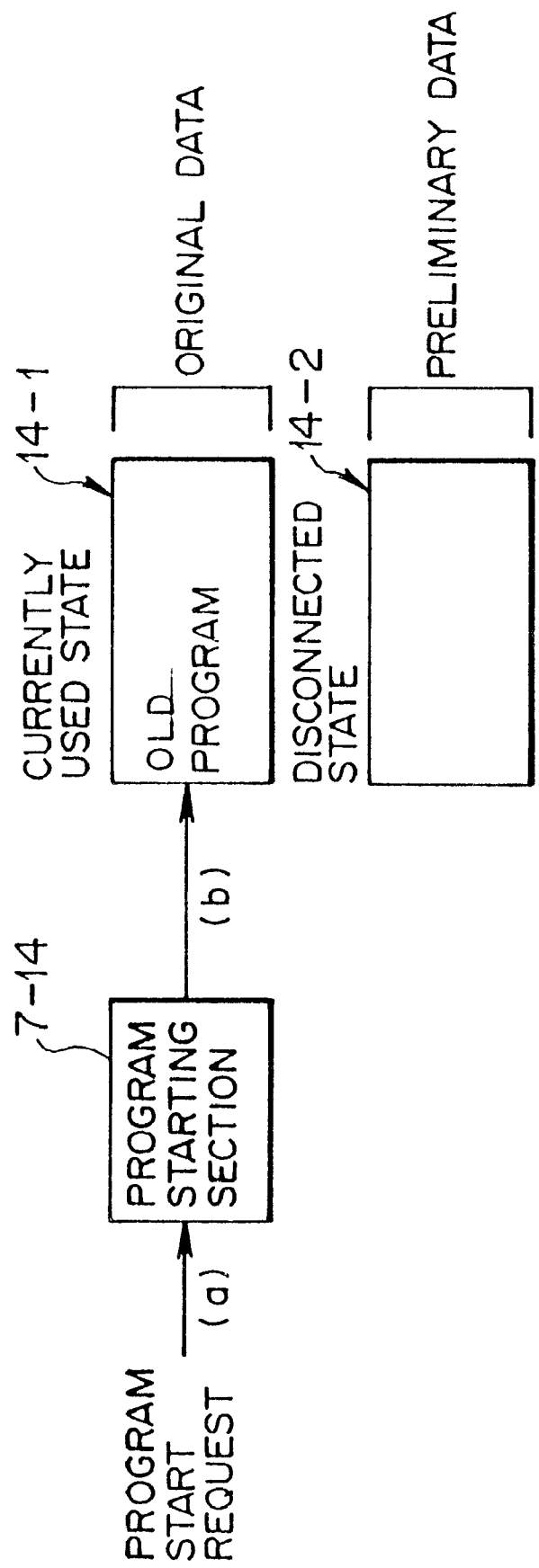

Then, as seen in FIG. 16, automatically or in response to a command inputted by the operator, the data duplicating registration section 7-1 stores and registers into the second memory apparatus 14-2 preliminary data, which back up arbitrary data (original data) to be used in software processing of the information processing apparatus, and stores and registers a relation between the original data and the preliminary data into the data duplicating registration table 14-3. It is to be noted that the preliminary data registered in the second memory apparatus 14-2 are in a disconnected condition.

Figure 17:
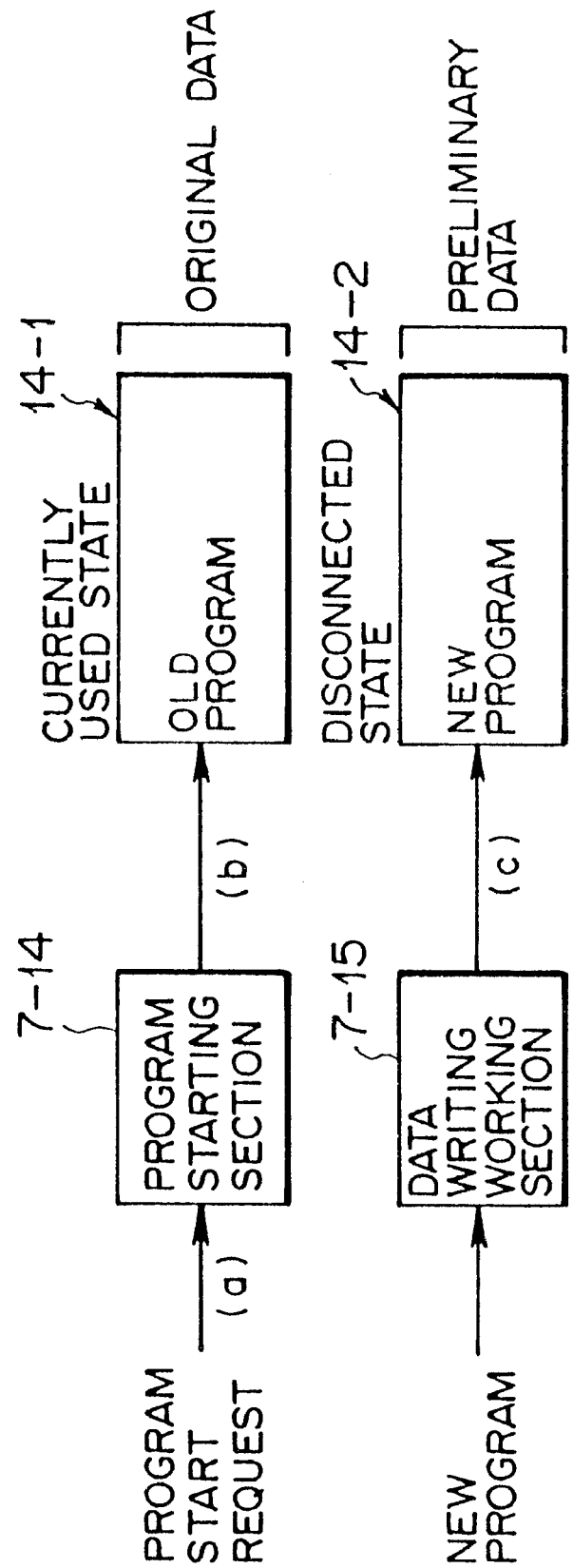

Then, the data writing section 7-15 writes a new program (new (or exchanging) program), which should be used in place of the currently operating program, into the preliminary data stored in the second memory apparatus 14-2 (refer to (c) of FIG. 17).

Then, automatically or in response to a command inputted by the operator, the data state control section 7-10 determines the new (or exchanging) program, which is in a disconnected state, as currently used data and controls the old (or exchanged) program, which is operating as the currently used data, into a disconnected state.

Figure 18:
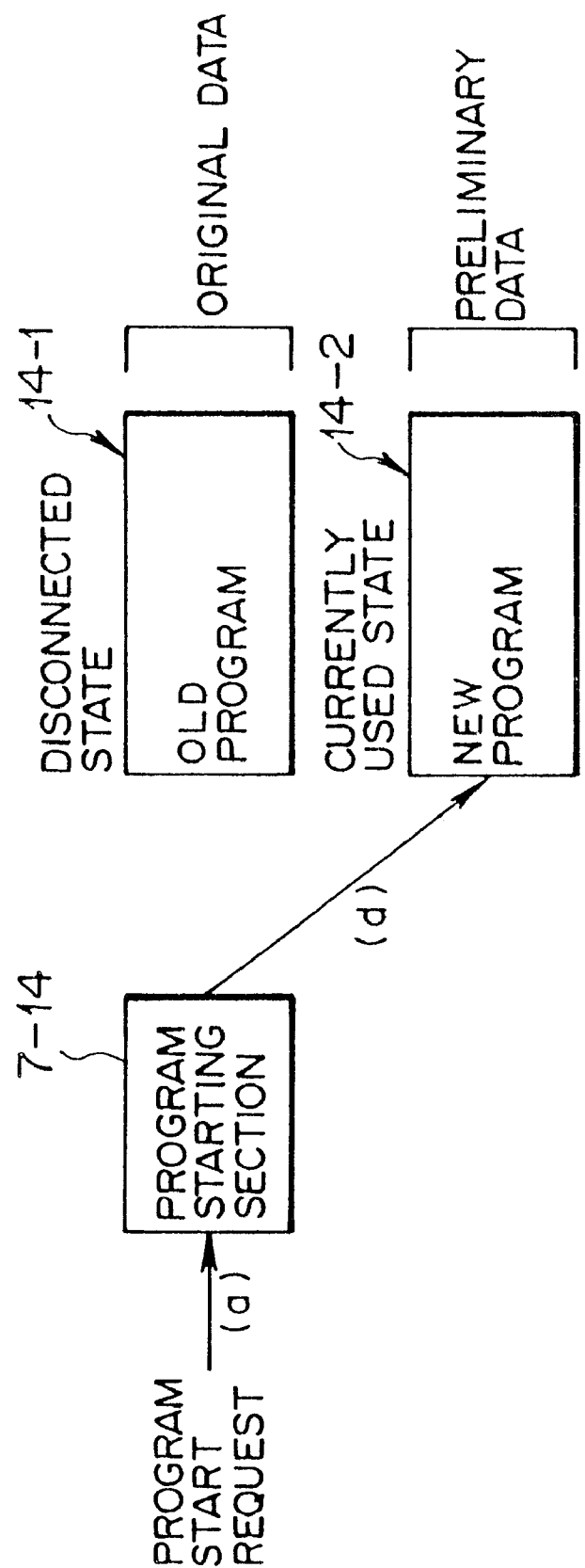

Consequently, the data of the second memory apparatus 14-2 in which a new program as preliminary data is stored can be changed instantaneously to currently used data, and if this program is thereafter started by the program starting section 7-14, then the old (or exchanged) program stored in the first memory apparatus 14-1 is data in a disconnected condition and will not be started, but the new (or exchanging) program stored in the second memory apparatus 14-2 is started (refer to (d) of FIG. 18).

It is to be noted that, when the new (or exchanging) program stored in the second memory apparatus 14-2 is started, the verification section 7-7 verifies the normality of the currently used data with check sums from the check information setting section 7-6, and after the normality of the new program is confirmed, the old (or changed) program as the original stored in the first memory apparatus 14-1 is newly re-written as a new (or exchanging) program. Consequently, the original data can be changed over to the currently used data.

In this instance, the preliminary data in the second memory apparatus which is in a stand-by state is put into a disconnected condition, and duplicating registration can be cancelled by a duplicated registration cancelling operation of the data duplicating cancellation section 7-2.

The present invention is not limited to the specifically described embodiment, and variations and modifications may be made without departing from the scope of the present invention.

What is claimed is:

1. An information processing apparatus for a digital switching system which performs software processing using an operating program or data stored in a shared data resource, comprising:

a shared first storage apparatus for storing original data including operating programs;

a shared second storage apparatus for storing preliminary data including operating programs which may back up the original data and may be used each as a substitute for the original data in the software processing of said switching system;

a unitary storage table; and data duplicating registration means for storing a relation between the original data and the preliminary data into said unitary storage table, upon occurrence of data error in any one of said original data, a corresponding one of said preliminary data may be provided as reserve data for use in the software processing of said switching system.

2. An information processing apparatus for a multi-processor system in which a plurality of processors individually perform software processing using a common operating program or data stored in a shared data resource to be individually accessed by said plurality of processors, said apparatus comprising:

a shared first storage apparatus independent of said plurality of processors for storing a variety of original data which may be shared by said plurality of processors, said first storage apparatus being adapted to be accessed by each processor independently of the other processors;

a shared second storage apparatus independent of said plurality of processors for storing a variety of preliminary data which may back up the respective original data and may be used each as a substitute for one of said original data in the software processing by each processor independently of the other processors;

a unitary storage table; and data duplicating registration means for storing a relation between said original data and said preliminary data into said unitary storage table, upon occurrence of data failure in any one of said original data, a corresponding one of said preliminary data is provided as reserve data for access by each and every processor.

3. An information processing apparatus as claimed in claim 1, further comprising data duplicating cancellation means for deleting from said unitary storage table the information of said relation between said original data and said preliminary data.

4. An information processing apparatus as claimed in claim 2, further comprising data change-over means for making a change-over between one of said original data and the corresponding one of said preliminary data for using one of said original data and the preliminary data as currently used which are currently being used in the software processing of the individual processor and for using the other data as stand-by state data which has the same data contents as those of said currently used data and may always back up said currently used data in the software processing of the individual processor.

5. An information processing apparatus as claimed in claim 4, further comprising:

data disconnection means for changing the state of said original data or preliminary data in said unitary storage table to disconnect said currently used data and said stand-by state data from each other; and data restoration means for, after disconnection of said currently used data and stand-by state data from each other by said data disconnecting means, changing the state of said original data or preliminary data in said storage table to restore the relation of said currently used data and stand-by state data.

6. An information processing apparatus as claimed in claim 2, further comprising:

check information setting means for setting check information for said currently used data and said stand-by state data; and verification mans for, when the software processing is to be executed using the currently used data by the individual processor, verifying the normality of said currently used data using said check information set by said check information setting means;

wherein, upon detection of no abnormality in said currently used data by said verification means, the individual processor may execute the software processing using said currently used data, but upon detection of an abnormality in said currently used data by said verification means, the individual processor may execute the software processing using said stand-by state data.

7. An information processing apparatus as claimed in claim 2, further comprising data variation processing means for performing data variation processing for said currently used data in one of said first and second storage apparatuses and simultaneously performing the same data variation processing for said stand-by state data in the other of said first and second storage apparatus.

8. An information processing apparatus as claimed in claim 7, wherein said data variation processing means includes data format variation means for, simultaneously with performing of data variation processing for said currently used data in said unitary storage table by said data variation processing means, performing substantially similar data variation processing of a different format for said stand-by state data in said unitary storage table.

9. An information processing apparatus as claimed in claim 2, further comprising one or more additional shared storage apparatuses each for storing a variety of preliminary data which is usable to back up the respective preliminary data of said second storage apparatus and/or the respective original data of said first storage apparatus and is usable each as a substitute for one of said preliminary data or one of said original data in the software processing by each processor independently of the other processors.

10. An information processing apparatus as claimed in claim 9, wherein said preliminary data stored in each of said additional shared storage apparatuses is usable to back up the respective preliminary data of any of the other additional shared storage apparatuses and usable each as a substitute for one of said preliminary data in the software processing by each processor independently of the other processors.

11. A data processing method employing an information processing apparatus for a multi-processor system in which a plurality of processors individually perform software processing using a common operating program or data stored in a shared storage apparatus to be individually accessed by said plurality of processors, said method comprising the steps of:

storing, in said shared storage apparatus, a variety of original data which may be used in the software processing of the individual processors and a variety of preliminary data which may back up the respective original data and may be used each as a substitute for one of the original data in the software processing by each processor independently of the other processors; and storing, into a unitary storage table, a relation between the original data and the preliminary data, upon occurrence of data failure in any one of the original data, a corresponding one of the preliminary data may be provided as reserve data for access by each and every processor.

12. A data processing method employing an information processing apparatus as claimed in claim 11, further comprising the step of deleting, from said unitary storage table in which the relation between the original data and the preliminary data is stored, the information of the relation between the original data and the preliminary data.

13. An information processing method as claimed in claim 11, further comprising one or more additional shared storage apparatuses each for storing a variety of preliminary data usable to back up the respective preliminary data and/or original data of said shared storage apparatus and usable each as a substitute for one of said preliminary data or one of the original data in the software processing by each processor independently of the other processors.

14. An information processing method as claimed in claim 13, wherein said preliminary data stored in each of said additional shared storage apparatuses is usable to back up the respective preliminary data of any of the other additional shared storage apparatuses and usable each as a substitute for one of said preliminary data in the software processing by each processor independently of the other processors.

15. A data processing method employing an information processing apparatus for a multi-processor system wherein a plurality of processors individually perform software processing using a common operating program or data stored in a shared storage apparatus to be individually accessed by the plurality of processors, said method comprising the steps of:

storing, into said shared storage apparatus, a variety of original data which may be used in the software processing by the individual processors and a variety of preliminary data which may back up the respective original data and may be used each as a substitute for one of the original data in the software processing by each processor independently of the other processors, and storing a relation between the original data and the preliminary data into said unitary storage table; and using one of the original data and the preliminary data as currently used data which are currently being used in the software processing and using the other of the original data and the preliminary data as stand-by state data which has the same data contents as those of the currently used data and may always back up the currently used data in the software processing of the individual processor.

16. A data processing method employing an information processing apparatus as claimed in claim 15, further comprising the step of making a change-over between the currently used data and the stand-by state data for use in executing the software processing.

17. A data processing method employing an information processing apparatus as claimed in claim 15, further comprising the step of changing the state of the original data or preliminary data in said unitary storage table to disconnect the currently used data and the stand-by data from each other.

18. A data processing method employing an information processing apparatus as claimed in claim 17, further comprising the step of further changing, after changing of the state of the original data or preliminary data into the disconnected state in said unitary storage table, the state of the original data or the preliminary data to restore the relation of the currently used data and the stand-by state data.

19. A data processing method employing an information processing apparatus as claimed in claim 15, further comprising the steps of:

preparing check information for the currently used data and the stand-by data; and verifying the normality of the currently used data using the check information, when executing the software processing using the currently used data;

wherein upon detection of no abnormality in the currently used data, the individual processor may execute the software processing using the currently used data in said verifying step, or upon detection of an abnormality in the currently used data, the individual processor then may execute the software processing using the stand-by state data in said verifying step, or upon detection of an abnormality is detected in the currently used data, the individual processor may execute the software processing using the stand-by state data.

20. A data processing method employing an information processing apparatus as claimed in claim 15, further comprising the step of performing, simultaneously with performing of data variation processing for the currently used data, the same data variation processing for the stand-by state data.

21. A data processing method employing an information processing apparatus as claimed in claim 15, further comprising the step of performing, when performing data variation processing is performed for the currently used data, substantially similar data variation processing of a different format for the stand-by state data.

* * * * *